United States Patent [19]
Julien et al.

[11] Patent Number: 6,027,814
[45] Date of Patent: Feb. 22, 2000

[54] PULVERULENT POLYAMIDE COMPOSITION FOR THE COATING OF METAL SUBSTRATES

[75] Inventors: Olivier Julien; Michael Werth, both of Bernay; Arnaud Tedoldi, Beaumont le Roger; Jean-Marc Sage, Oullins, all of France

[73] Assignee: Elf Atochem S.A., France

[21] Appl. No.: 08/860,484

[22] PCT Filed: Dec. 27, 1995

[86] PCT No.: PCT/FR95/01740

§ 371 Date: Oct. 6, 1997

§ 102(e) Date: Oct. 6, 1997

[87] PCT Pub. No.: WO96/20979

PCT Pub. Date: Jul. 11, 1996

[30] Foreign Application Priority Data

Dec. 29, 1994 [FR] France ................................ 94 15854

[51] Int. Cl.$^7$ ............................ B32B 27/00; C08F 16/06
[52] U.S. Cl. ........................ 428/425.8; 525/56; 525/57; 525/58; 525/88; 525/165; 525/167; 525/168; 525/178; 525/240; 525/426; 525/540
[58] Field of Search .................... 525/56, 57, 58, 525/88, 165, 167, 168, 178, 240, 426, 540; 428/425.8, 458, 474.4

[56] References Cited

U.S. PATENT DOCUMENTS

| | | | |
|---|---|---|---|
| 4,207,410 | 6/1980 | Burzin et al. | 528/288 |
| 4,230,838 | 10/1980 | Foy et al. | 525/408 |
| 4,248,977 | 2/1981 | Wertz . | |
| 5,229,458 | 7/1993 | Schimmel et al. | 525/108 |
| 5,409,999 | 4/1995 | Merval et al. | 525/423 |

FOREIGN PATENT DOCUMENTS

| | | |
|---|---|---|
| 293292 | 11/1988 | European Pat. Off. . |
| 307623 | 4/1991 | European Pat. Off. . |
| 412888 | 6/1994 | European Pat. Off. . |
| 251510 | 11/1987 | German Dem. Rep. . |
| 277395 | 4/1990 | German Dem. Rep. . |
| 2025914 | 12/1971 | Germany . |
| 2008230 | 1/1990 | Japan . |

OTHER PUBLICATIONS

PCT/FR95/001740 (WO 96/20979), European Search Report, Apr. 18, 1996.

*Primary Examiner*—Samuel A. Acquah
*Attorney, Agent, or Firm*—Bell, Boyd & LLoyd

[57] ABSTRACT

The invention relates to a composition including (i) at least one polyamide and at least one copolymer (A) of ethylene with at least one comonomer chosen from unsaturated carboxylic acids, esters of unsaturated carboxylic acids or vinyl esters of saturated carboxylic acids and (ii) being in powder form. These compositions are subsequently deposited on metal substrates and then a highly corrosion-resistant coating is obtained by melting.

13 Claims, No Drawings

PULVERULENT POLYAMIDE COMPOSITION FOR THE COATING OF METAL SUBSTRATES

FIELD OF THE INVENTION

The invention relates to a polyamide-based powder composition for coating metal substrates.

BACKGROUND OF THE INVENTION

Polyamides are commonly employed for coating metal substrates, especially because of their good mechanical properties such as abrasion resistance, impact strength and chemical inertness towards many products such as hydrocarbons, bases and inorganic acids.

The adhesiveness of polyamides to metals is known, however, to be insufficient, as a result of poor wetting ability of polyamides in a molten state. To overcome this shortcoming the metal substrate has been coated with an undercoat, called an adhesion primer, intended to ensure the mechanical bonding and anchoring of the polyamide powder. The adhesion primer which is employed is generally based on heat-curable resins and supplied in powder form or in solution or in suspension in organic or aqueous solvents. Additional plant must therefore be provided for the possible removal of the solvents and for curing the primer before the substrate which is thus clad is coated with the polyamide powder.

In addition, the curing and/or drying of the primer significantly lengthen the duration of the coating operations and hence their cost.

Mixtures of polyamides and of epoxy/sulphonamide resins which can be employed for coating metal substrates without employing an adhesion primer undercoat have been described in Patent EP 0 412 888. These mixtures of polyamide and of epoxy/sulphonamide resins in powder form can be applied to the substrate with an electrostatic gun. It then suffices to pass the substrate thus coated through an oven to obtain melting of the powder and a uniform coating. It is also possible to preheat the substrate above the melting point of the powder and to immerse it in a fluidized bed of the powder.

DESCRIPTION OF THE INVENTION

There has now been found another polyamide-based powder composition for coating metal substrates without an adhesion primer, which exhibits very good adhesiveness which is durable in time. The compositions of the invention also exhibit other advantages:

when the powder is applied with the gun, the coating does not fall off during the introduction and during the period in the oven;

a metal plate coated with a film resulting from the melting of the powder deposited on the substrate is slashed and then subjected to a saline mist and exhibits a limited corrosion growth;

good resistance to hot water, which makes it possible, for example, to make household water-heater coatings.

The present invention is a composition including (i) at least one polyamide and at least one copolymer (A) of ethylene with at least one comonomer chosen from unsaturated carboxylic acids, unsaturated carboxylic acid esters or vinyl esters of saturated carboxylic acids and (ii) being in powder form.

The compositions of the invention are intimate mixtures of polyamide and of copolymer (A), that is to say that each grain of the powder includes polyamide and copolymer (A).

Within the meaning of the invention the polyamide is intended to mean products of condensation of lactams, of amino acids or of diacids with diamines and, as a general rule, any polymer made up of units linked together by amide groups.

The polyamide advantageously has a melting temperature between 130 and 270° C., like, for example, PA-6, PA-66, PA-6,66, PA-11, PA-12, PA-11,12 and PA-6,12.

Those advantageously employed are polyamide 11, which can be obtained by condensation of 11-aminoundecanoic acid or of lactam 11, and polyamide 12, which can be obtained by condensation of 12-aminododecanoic acid or of lactam 12. It is also possible to employ polyamides 12—12.

Polyamide is also intended to mean polymers which have polyamide blocks in their chain. These are, for example, polyetheresteramides made up of polyamide blocks and of polyether blocks linked by ester functional groups. U.S. Pat. No. 4,230,838 describes a possible preparation of these products. The polymerization of a lactam is performed in the presence of a diacid to obtain a polyamide with carboxylic acid ends, and a polyether with hydroxyl ends is then added to it. The polyether is preferably polytetramethylene glycol, polypropylene glycol or polyethylene glycol.

Other polymers which have polyamide blocks in their chain can be prepared according to U.S. Pat. No. 4,207,410. A lactam, a diacid and a polyether with hydroxyl ends are mixed in the presence of water and the temperature is maintained. A polymer which has polyamide blocks and polyether blocks mixed with diacid is obtained, all these components being linked by ester functional groups. It would not constitute a departure from the scope of the invention to employ a mixture of these polyamides.

Examples of copolymer (A) which may be mentioned are copolymers of ethylene and of (meth)acrylic acid, copolymers of ethylene and of an ester of (meth)acrylic acid or copolymers of ethylene and of vinyl acetate (EVA), these copolymers (A) optionally including grafted or copolymerized unsaturated carboxylic acid anhydride units.

The copolymer (A) advantageously includes (i) at least 50% by weight of ethylene units, (ii) units like (meth)acrylic acid and/or (meth)acrylic acid esters and not more than 6% by weight of copolymerized maleic anhydride.

By way of example, the copolymer (A) may include 60 to 90% by weight of ethylene, 5 to 35% by weight of ethyl acrylate and 0.1 to 5% by weight of maleic anhydride and the melt index is higher than 100 g/10 min according to the standards NFT 51016, ASTM D1238, DIN 53735 and ISO 1133.

The copolymer (A) may also be a copolymer of ethylene, of (meth)acrylic acid and of an unsaturated carboxylic acid anhydride which is grafted with a monoamine product.

This monoamine product is, for example, laurylamine, 11-aminoundecanoic acid or bis(hydroxyethylene)amine. The grafting may be performed in an extruder or in a mixer; the number of moles of monoamine product which are grafted does not exceed the number of moles of unsaturated carboxylic acid anhydride.

The copolymer (A) may also be a copolymer including ethylene units, unsaturated carboxylic acid and/or unsaturated carboxylic acid ester units and unsaturated epoxide units.

Examples which may be mentioned are the copolymers of ethylene, of (meth)acrylic acid and/or (meth)acrylic acid ester and of glycidyl (met h)acrylate; these copolymers advantageously include at least 50% by weight of ethylene, (meth)acrylic acid and/or (meth)acrylic acid ester units, and up to 10% by weight of glycidyl (meth)acrylate.

In addition to the polyamide and the copolymer (A), the compositions of the invention may include EVOHs and/or polyvinyl alcohols (PVALs). EVOH is intended to mean copolymers including ethylene, vinyl alcohol and optionally vinyl acetate units. Those advantageously employed are the EVOHs in which the quantity of vinyl alcohol and optionally of vinyl acetate represents at least 40% by weight of the EVOH with a vinyl acetate/vinyl alcohol ratio of between 0 and 0.7.

Those preferably employed are the copolymers including, by weight, 40 to 60% of vinyl alcohol and not more than 2% of vinyl acetate and which have a melt index of between 5 and 20 g/10 min, measured at 210° C. under a 2.16 kg load with a 2.095 mm die.

The EVOH may also be modified, for example by grafting with an unsaturated carboxylic acid anhydride by reactive extrusion. It is possible to graft with phthalic anhydride in an extruder at about 160° C.

The EVOH may also be modified with phosphoric, phosphorous or hypophosphorous acid or boric acid by mixing in an extruder at about 160° C. para-Hydroxybenzoic acid may also be grafted onto the EVOH by reactive extrusion at approximately 250° C. with strong degassing.

The EVOH may also be grafted with a polyamide or a polyamide oligomer. A reactive extrusion at about 250° C. under acid catalysis may be employed. The polyamide is preferably a polyamide oligomer of Mn lower than 5 000 and ending in a single acid functional group. This oligomer may be obtained, for example, by condensation of an amino acid in the presence of a monoacid like lauric acid.

The PVALs may also be modified by acetalization with an aldehyde like, for example, butyraldehyde.

The present invention also relates to compositions including (i) at least one polyamide and at least one EVOH and/or a modified PVAL, but not including the copolymer (A) described above and (ii) being in powder form.

The quantity of copolymer (A) and optionally of copolymer (A) and of EVOH and/or of modified or unmodified PVAL or the quantity of EVOH and/or of modified PVAL which is added to the polyamide may vary within wide limits. The quality of the coating obtained increases with the quantity added.

A quantity of 1 to 300 parts (i) of copolymer (A) or (ii) of copolymer (A) and of EVOH and/or of modified or unmodified PVAL or (iii) of EVOH and/or of modified PVAL per 1 000 parts of polyamide, advantageously from 1 to 175 parts, and preferably from 3 to 150 parts, is usually sufficient. The quantity of EVOH and/or of modified or unmodified PVAL is generally lower in relation to the quantity of copolymer (A).

The compositions of the invention are preferably in the form of a polyamide matrix in which there are dispersed nodules (i) of copolymer (A) and optionally of EVOH and/or of modified or unmodified PVAL or (ii) of EVOH and/or of modified PVAL. The copolymer (A) nodules are advantageously from 0.1 to 0.5 μm in diameter. The nodules of EVOH and/or of modified or unmodified PVAL are smaller than 60 μm. The quality of the dispersion of the nodules in the polyamide matrix increases with the quality of the mixture of the products and the number of reactive functional groups present in the nodules.

In general, the particle size of the powders in accordance with the invention may be between 5 μm and 1 mm.

A first process for obtaining a powder composition according to the invention consists in blending, as a melt, (i) the copolymer (A) or (ii) the copolymer (A) and the EVOH and/or the modified or unmodified PVAL or (iii) the EVOH and the modified PVAL with the polyamide in a mixer of an appropriate type. The blending temperature may be between 150 and 300° C. and preferably between 180 and 230° C.

A master mixture or a final product may be prepared.

The final product is ground according to the usual techniques, to the particle size desired for the coating. The procedure may also involve atomizing or precipitation.

The master mixture, which presents the advantage of ensuring good predispersion of the copolymer (A) and optionally of the EVOH and/or of the modified or unmodified PVAL or of the EVOH and/or of the modified PVAL within the polyamide matrix can then be blended once again with the polyamide according to the process referred to above.

A second process for obtaining powder compositions according to the invention consists in performing a (co)polycondensation of the polyamide monomers in the presence (i) of the copolymer (A) or (ii) of the copolymer (A) and of the EVOH and/or of the modified or unmodified PVAL or (iii) of the EVOH and/or of the modified PVAL. To this end, the copolymer (A) and optionally the EVOH and/or the PVAL or only the EVOH and/or the modified PVAL are introduced into the autoclave at the same time as the polyamide monomers. The polymerization is performed by the usual procedures. The operation is generally carried out at a temperature of between 150 and 300° C. and preferably between 190 and 250° C.

Any kind of apparatus used for the polycondensation of polyamides may be employed. An example which may be mentioned is a reactor equipped with stirring at approximately 50 revolutions/min, capable of withstanding a pressure of 2 MPa. The polycondensation period may be between 5 and 15 hours and preferably between 4 and 8 hours. When the polycondensation operations are finished, a mixture is obtained in the form of granules which are ground up to the desired particle size. The procedure may also involve precipitation or atomization.

According to a first alternative form, the present invention also relates to a composition including (i) at least one polyamide powder and at least one powder of a copolymer (A) of ethylene with at least one comonomer chosen from unsaturated carboxylic acids, unsaturated carboxylic acid esters or vinyl esters of saturated carboxylic acids.

It is also possible to add EVOHs and/or modified or unmodified PVALs or to employ mixtures of polyamide powder and of powdered EVOH and/or modified PVAL and containing no powdered copolymer (A), that is to say that the compositions of this first alternative form of the invention are the same as those of the main invention, but each grain of the powder is either polyamide or copolymer (A) or EVOH and/or PVAL.

The particle sizes are the same as in the first form of the invention.

The components other than the polyamide advantageously have a particle size smaller than 60 μm.

The quantity (i) of copolymer (A) or (ii) of copolymer (A) and of EVOH and/or of modified or unmodified PVAL or (iii) of EVOH and/or of modified PVAL may be between 1 and 300 and preferably 3 and 150 parts per 1 000 parts of polyamide.

A process for preparing these powder mixtures consists in dry-mixing the various components or a master mixture, previously converted into fine powder form, and the polyamide powder. This dry mixing or dry blending generally does not require any special apparatus; it can be performed at ambient temperature.

According to a second alternative form, the compositions of the invention are also intermediates between the invention and the first alternative form, that is to say that they may be:

either powders of polyamide and of copolymer (A) in which each grain contains polyamide and copolymer (A) which are mixed with EVOH and/or modified or unmodified PVAL powders;

or powders of polyamide and of EVOH and/or of modified or unmodified PVAL in which each grain contains polyamide and EVOH and/or PVAL, which are mixed with powdered copolymers (A);

or any other combination.

The preparation of the compositions according to this second alternative form of the invention is a combination of the processes already described above.

The compositions of the invention may also contain additives such as fillers, pigments, anticratering or reducing agents, antioxidants, etc., antioxidants like copper iodide combined with potassium iodide, phenol derivatives and hindered amines, fluidizing agents, reinforcing and nucleating fillers like calcium and/or magnesium carbonate, dolomite (calcium magnesium double carbonate), quartz, boron nitride, kaolin (sold under the name "Frantex®"), wollastonite, titanium dioxide, ballotini, talc, mica, which are sold under the names "Plastorite" (mixture of quartz, mica and chlorite), "Minex®" (calcium carbonate) and carbon black, UV stabilizers like, for example, resorcinol derivatives, benzotriazoles or salicylates, anticrating agents, or spreading agents, pigments like, for example, titanium dioxide, carbon black, cobalt oxide, nickel titanate, molybdenum disulphide, aluminium flakes, iron oxide, zinc oxide, and organic pigments like phthalocyanine and anthraquinone derivatives.

It is possible to incorporate into the compositions of the invention additives which are chosen from those described above and whose respective proportions remain within the limits usually encountered in the field of the polyamide-based powder compositions for coating metal substrates. In general up to 100 k by weight of the said constituents is incorporated, that is to say that these fillers may represent the same weight as the quantity of polyamide and of copolymer (A) and optionally of EVOH and/or of PVAL or as the quantity of polyamide and of EVOH and/or of modified PVAL.

These additives may be incorporated by any means into the compositions of the invention.

They may be added in the polyamide according to the first or the second process for preparation of the first form of the invention, or may be added to the mixture of powders during the preparation of the first alternative form of the invention. However, in this first alternative form of the invention, large quantities of additives (for example 50 to 100 parts 5 per 100 parts of polyamide) will be avoided. It will then be preferred to incorporate these additives into the polyamide according to the first form of the invention.

By analogy with the second alternative form of the invention it is also possible to prepare compositions including:

either a powder which has (i) grains each of which consists of polyamide and of copolymer (A) and optionally of EVOH and/or of PVAL or of polyamide and is of EVOH and/or of modified PVAL and (ii) additives in powder form, or a powder which has (i) grains each of which consists of polyamide and of a proportion of the additives and (ii) which have grains of copolymer (A) and (iii) grains of additives, or a powder which has grains each of which consists of polyamide, of copolymer (A) and of the additives, or any other combination.

The present invention also relates to the use of the powder compositions as defined above for coating metal substrates and to the substrates thus coated. The metal substrate may be chosen from a wide range of products. It may involve articles of ordinary or galvanized steel or articles made of aluminium or of aluminium alloy. The metal substrate may be of any thickness (for example of the order of a tenth of a mm, just as of the order of several tens of a cm).

According to a known technique which per se does not form a subject-matter of the invention, the metal substrate, and especially when made of ordinary steel, aluminium or aluminium alloy, may have undergone one or more of the following surface treatments, no limitation being implied by this list: rough degreasing, alkaline degreasing, brushing, shot- or sandblasting, fine degreasing, hot rinsing, phosphating degreasing, iron/zinc/trication phosphating, chromating, cold rinsing, chromic rinsing.

By way of examples of metal substrates that are suitable for being coated with a composition according to the invention there may be mentioned: degreased, smooth or shot-blasted steel, phosphated degreased steel, iron or zinc phosphated steel, Sendzimir galvanized steel, zinc-electroplated steel, bath-galvanized steel, electrophoresis steel, chromated steel, anodized steel, carborundum sanded steel, degreased aluminium, smooth or shot-blasted aluminium and chromated aluminium.

The polyamide-based composition according to the invention is therefore applied in powder form onto the metal substrate. The application of the powder composition may be performed according to the application techniques usually employed. Grinding of the powders may be performed in equipment which is cooled cryogenically or by a strong intake of air (impeller, hammer or disc mills and the like). The powder particles obtained are selected in suitable equipment to remove the undesired particle size fractions: for example grains which are too coarse and/or too fine.

Among the techniques of application in powder form there may be mentioned electrostatic spraying, immersion in a fluidized bed, an electrostatic fluidized bed (for example that described in Patents DD 277 395 and DD 251 510), techniques which are preferred for carrying out the coating of the substrates according to the invention.

In electrostatic spraying the powder is introduced into a gun, where it is conveyed by compressed air and passes through a nozzle raised to a high voltage, generally between about ten and about a hundred kilovolts. The voltage applied may be positive or negative in polarity. The powder flow rate in the gun is generally between 10 and 200 g/min and preferably between 50 and 120 g/min. As it passes through the nozzle, the powder becomes electrostatically charged. The powder particles conveyed by the compressed air are applied onto the metal surface to be coated, the said surface itself being earthed, that is to say connected to a zero electrical potential. The powder particles are retained on this surface by their electrostatic charge. These forces are sufficient for the powder-treated object to be coated and moved and then heated in an oven at a temperature which causes the powder to melt.

Electrostatic spraying of the polyamide-based compositions according to the invention, whatever the polarity of application, offers an undoubted advantage because it will be possible, in particular, to employ existing standard industrial plants which are designed for the electrostatic spraying of powder coatings using only one polarity; the metal substrate is subjected to a surface preparation in this case.

In electrostatic spraying, the proportion of polymer (A) and optionally of EVOH and/or of PVAL per 1 000 parts of polyamide or of EVOH and/or of modified PVAL per 1 000 parts of polyamide is advantageously between 3 and 150.

A powder of average particle size between 5 and 100 μm and preferably between 20 and 80 μm can generally be employed. The thickness of the coating is preferably between 80 and 140 μm.

In the case of the process of immersion in a fluidized bed, the metal substrate to be coated, carefully prepared, for example by being subjected to one or more surface treatments listed above, is heated in an oven to a temperature which is determined especially in accordance with the nature of the said substrate, its form, its thickness and the desired coating thickness. Thus heated, the substrate is then immersed in a powder composition according to the invention, which is kept in suspension by a gas circulating in a vessel with a porous bottom. The powder melts on contact with the hot metal surfaces and thus forms a deposit whose thickness is a function of the temperature of the substrate and of its duration of immersion in the powder.

In fluidized bed immersion the preferred proportion of copolymer (A) and optionally of EVOH and/or of PVAL per 1 000 parts of polyamide or of EVOH and/or of modified PVAL per 1 000 parts of polyamide is advantageously between 3 and 150. The particle size of the powders used in a fluidized bed may be between 10 and 1 000 μm and preferably between 40 and 160 μm. In general, the coating thickness may be between 150 and 1 000 μm and preferably between 350 and 450 μm.

It would not constitute a departure from the scope of the invention to apply an adhesion primer to the degreased metal substrate before applying the powders of the invention thereto.

The present invention also relates to a composite material including a metal substrate and including a coating made up of the powder compositions of the invention. The invention also relates to the above material, the powder layer having been melted to form a coating.

WAYS OF IMPLEMENTING THE INVENTION

EXAMPLES

1) The following products are employed in the examples:

PA-11: denotes a polyamide 11 of molecular mass $\overline{M}n$ before application of between 9 000 and 15 000 (except for the PA-11 of Example 6).

Terpolymer 1/: denotes a copolymer which has ethylene units, 6% by weight of ethyl acrylate units and 3% by weight of maleic anhydride units. The melt index is 200 g/10 min according to NFT 51016.

It is sold under the trade name Lotader® 8200.

Terpolymer 5/: denotes a copolymer which has 44 mol % of ethylene units, vinyl alcohol units, and a melt index of 12 g/10 min measured at 210° C. under a 2.16 kg load and with a 2.095 mm die.

It is sold under the trade name Soarnol® A.

Terpolymer 6/: denotes the terpolymer 5/ grafted with 5% of phthalic anhydride (expressed in weight % of terpolymer 6/).

Terpolymer 8/: denotes the terpolymer 5/ grafted with 10% of para-hydroxybenzoic acid (expressed in weight % of terpolymer 8/).

Terpolymer 7/: denotes the terpolymer 5/ modified with hypophosphorous acid according to the following procedure: terpolymer 5/ is granulated and then immersed in an aqueous solution of hypophosphorous acid at a concentration of 50 % by weight; the whole is then placed in an oven at 50° C. for 3 days. After washing and draining, the granules are dried under vacuum at 50° C. and then ground.

Terpolymer 9/: denotes a mixture on a "Brabender" mixer, at approximately 160° C., of 80 mass % of terpolymer 5/ and 20 mass % of terpolymer 5/ grafted with 40 mass % of polyamide 11 oligomer of mass $\overline{M}n$ 1500 limited using lauric acid.

Terpolymer 10/: denotes a terpolymer of PVAL type which has reacted by acetalization with an aldehyde whose dynamic viscosity, measured at 20° C. according to DIN Standard 53015 in a methanol solution at a concentration of 6%, is between 4 and 6 mPa s and the softening range, measured according to DIN ISO Standard 426, is between 150 and 170° C. It is sold under the trade name Mowital® B 30 T.

Terpolymer 11/: denotes a terpolymer of PVAL type which has reacted by acetalization with an aldehyde whose dynamic viscosity, measured at 20° C. according to DIN Standard 53015 in a methanol solution at a concentration of 6%, is between 15 and 20 mPa s and the softening range, measured according to DIN ISO Standard 426, is between 185 and 210° C. It is sold under the trade name Mowital® B 60 T.

2/ Anticorrosion action

Direct application without primer 2.1 Example of the pure products PA-11 and terpolymer 1/ and of mixtures.

Formulae and characteristics of the powders before application

Table 2.1 below summarizes the composition of the pure products (2.1 and 2.2) and of the mixture 2.3 produced in a blender at a temperature of between 190 and 210° C. and with a residence time of the order of 30 seconds.

The proportions shown are expressed in parts by weight (i.e. 5 parts means 5 g in 1 000 g of PA-11).

Product 2.2 is ground cryogenically and then screened to 200 μm.

Products 2.1 and 2.3 are ground in order to obtain a powder of conventional particle size for application, on the one hand, by the electrostatic route and, on the other hand, by the immersion route.

Before application, powder 2.3 consists of a polyamide matrix containing nodules of terpolymer 1/, these phases being essentially between 0.1 and 0.5 μm in size.

TABLE 2.1

| Product | PA-11 | Terpolymer 1/ |
|---------|-------|---------------|
| 2.1     | 1000  |               |
| 2.2     |       | 1000          |
| 2.3     | 1000  | 80            |

Application

All the substrates are subjected to degreasing before the application.

Table 2.2 below summarizes the application conditions.

TABLE 2.2

| Product | Electrostatic application to a 100 × 100 × 1 mm steel plate | Application by immersion to a 100 × 100 × 3 mm steel plate |
|---|---|---|
| 2.1 | Smooth substrate ES negative −20 kV Melting in ventilated oven 4 min at 220° C. | Smooth substrate Substrate preheating in ventilated oven 10 min at 330° C. 4 s immersion in fluidized bed |
| 2.2 | Shot-blasted substrate ES negative −60 kV Melting in ventilated oven 5 min at 140° C. | Same as in 2.1 |
| 2.3 | Shot-blasted substrate ES negative −60 kV Melting in ventilated oven 5 min at 220° C. | Same as in 2.1 |

The films obtained cool freely in the ambient air.

The films obtained by electrostatic application have a thickness of 110±20 µm, by immersion of 400±50 µm.

Evaluation

The combined plate plus film is then evaluated in the saline mist according to NF Standard X 41 002. The films are incised as far as the metal with a diagonal cross and the growth of corrosion is measured visually from this cut. Complete corrosion corresponds to a growth of 35 mm.

Table 2.3 below collates the results obtained after 250 hours of saline mist.

TABLE 2.3

| Product | Electrostatic application to a 100 × 100 × 1 mm steel plate | Application by immersion to a 100 × 100 × 3 mm steel plate |
|---|---|---|
| 2.1 | Complete corrosion | 20 mm of corrosion |
| 2.2 | 12 mm of corrosion Numerous blisters of 4 mm mean diameter | Complete corrosion |
| 2.3 | 1 mm of corrosion at the cross | 1 mm of corrosion at the cross |

2.2 Example of the formulated products PA-11 and terpolymer 1/

Formulae and characteristics of the powders before application

Table 2.4 below summarizes the composition of the mixtures produced in a blender at a temperature of between 190 and 210° C. and with a residence time of the order of 30 seconds. They are based on pure (also called natural) PA-11 or else white PA-11. In this case the PA-11 is coloured with 100 parts by weight of white pigments.

TABLE 2.4

| Product | Natural PA-11 | White PA-11 | Terpolymer 1/ |
|---|---|---|---|
| 2.4.1 | 1000 | | 80 |
| 2.4.2 | 1000 | | 150 |

TABLE 2.4-continued

| Product | Natural PA-11 | White PA-11 | Terpolymer 1/ |
|---|---|---|---|
| 2.4.3 | | 1000 | 80 |
| 2.4.4 | | 1000 | 150 |

The products are ground in order to obtain a powder of conventional particle size for application, on the one hand, by the electrostatic route and, on the other hand, by the immersion route.

The powders obtained before application consist of a polyamide matrix containing nodules of terpolymer 1/, these phases being essentially between 0.1 and 0.5 µm in size.

Application

All the substrates are subjected to degreasing and shot-blasting before the application.

The conditions of application by an electrostatic and immersion route are those set out in Table 2.2 in the case of product 2.3.

Evaluation

The combined plate plus film is next evaluated using saline mist, according to NF Standard X 41 002. The films are incised as far as the metal with a diagonal cross and the growth of the corrosion is measured visually from this cut. Complete corrosion corresponds to a growth of 35 mm.

Table 2.5 below collates the results obtained after 2 000 hours of saline mist.

TABLE 2.5

| | Measurement of the corrosion (expressed in mm) | |
|---|---|---|
| Product | Electrostatic application to a 100 × 100 × 1 mm steel plate | Application by immersion to a 100 × 100 × 3 mm steel plate |
| 2.4.1 | 6 | 4 |
| 2.4.2 | 5 | 3 |
| 2.4.3 | 4 | 8 |
| 2.4.4 | 5 | 5 |

3) The grafting of the terpolymer 5/ increases the adhesion in comparison with that obtained with the unmodified terpolymer 5/:

Direct application without primer

Formulae and characteristics of the powders before application

Table 3.1 below summarizes the composition of the mixtures produced in a blender at a temperature of between 190 and 210° C. and with a residence time of the order of 30 seconds. They are based on pure (also called natural) PA-11.

The proportions shown are expressed in parts by weight (i.e. 5 parts means 5 g in 1 000 g of PA-11).

The products obtained are ground in order to obtain a powder of conventional particle size for application by the immersion route.

Before application, the product is a powder in the case of which one of the terpolymers 5/ to 8/ is present in the polyamide matrix in the form of nodules less than 60 µm in size.

TABLE 3.1

| Product | Natural PA-11 | Terpolymer 5/ | Terpolymer 6/ | Terpolymer 8/ | Terpolymer 7/ |
|---|---|---|---|---|---|
| 3.1 | 1000 | 40 | | | |
| 3.2 | 1000 | | 40 | | |
| 3.3 | 1000 | | | 40 | |
| 3.4 | 1000 | | | | 40 |

Application

The substrate considered is degreased and shot-blasted steel.

The other conditions of application by immersion are those set out in Table 2.2 in the case of product 2.3.

Evaluation

After application, the adhesion is evaluated one day after the application in accordance with NF Standard T 58-112.

A score of 0 to 4 is given as a function of the adhesion obtained:

Class 4: the film cannot be separated from the metal

Class 3: the film separates irregularly, the bonding is complete over at least 50% of the surface Class 2: the film separates irregularly, the force necessary for tearing away is high and is at the limit of the strength of the material Class 1: the film separates from the surface easily, the bonding is weak Class 0: the material exhibits no bonding to the surface.

The classes with intermediate properties may be scored 0.5, 1.5 and so on.

Results

These are summarized in Table 3.2 below:

TABLE 3.2

| Product | Adhesion |
|---|---|
| 3.1 | 2.5 |
| 3.2 | 3 |
| 3.3 | 4 |
| 3.4 | 3.5 |

4/ Promoter of adhesion and of maintaining the adhesion, coupled with EVOH: SYNERGY effect Direct application without primer Formulae and characteristics of the powders before application Table 4.1 below summarizes the composition of the mixtures produced in a blender at a temperature of between 190 and 210° C. and with a residence time of the order of 30 seconds. They are based on pure (also called natural) PA-11.

These examples are ordered so as to follow the modifications by the terpolymers 5 (or derivatives) of the coupling with terpolymer 1/.

The proportions shown are expressed in parts by weight (i.e. 5 parts means 5 g in 1 000 g of PA-11).

The products are ground in order to obtain a powder of conventional particle size for application by the immersion route.

Before application, the powder consists of a polyamide matrix containing nodules of terpolymer 1/, these phases being essentially between 0.1 and 0.5 μm in size.

In the case where the powder also contains a terpolymer 5/ to 10/, the latter is also present in the polyamide matrix in the form of nodules essentially smaller than 60 μm in size.

TABLE 4.1

| Product | Natural PA-11 | Terpolymers 5/ | 6/ | 8/ | 9/ | 7/ | 10/ | 11/ | 1/ |
|---|---|---|---|---|---|---|---|---|---|
| 4.1 | 1000 | 40 | | | | | | | |
| 4.2 | 1000 | | | | | | | | 80 |
| 4.3 | 1000 | 40 | | | | | | | 80 |
| 4.4 | 1000 | | 40 | | | | | | |
| 4.5 | 1000 | | 40 | | | | | | 80 |
| 4.6 | 1000 | | | 40 | | | | | |
| 4.7 | 1000 | | | 40 | | | | | 80 |
| 4.8 | 1000 | | | | 40 | | | | |
| 4.9 | 1000 | | | | 40 | | | | 80 |
| 4.10 | 1000 | | | | | 40 | | | |
| 4.11 | 1000 | | | | | 40 | | | 80 |
| 4.12 | 1000 | | | | | | 40 | | |
| 4.13 | 1000 | | | | | | 40 | | 80 |
| 4.14 | 1000 | | | | | | | 40 | |
| 4.15 | 1000 | | | | | | | 40 | 80 |

Application

The substrate considered is degreased and shot-blasted steel.

The other conditions of application by immersion are those set out in Table 2.2 in the case of product 2.3.

Evaluation

The initial adhesion of the films to substrate is measured before the saline mist test and after 1000 hours of this same test (see part 2/).

The evaluation of the adhesion is carried out as in 3/on the film coating the plate on both sides and not slashed.

Results

These are summarized in Table 4.2 below:

TABLE 4.2

| Product | Initial adhesion | Adhesion after 1000 h of saline mist |
|---|---|---|
| 4.1 | 2.5 | 0.5 |
| 4.2 | 1.5 | 0 |
| 4.3 | 3.5 | 1 |
| 4.4 | 3 | 0.5 |
| 4.5 | 4 | 2 |
| 4.6 | 4 | 0.5 |
| 4.7 | 4 | 1.5 |
| 4.8 | 2 | 0.5 |
| 4.9 | 4 | 2 |
| 4.10 | 3.5 | 1 |
| 4.11 | 4 | 2 |
| 4.12 | 2 | 0.5 |
| 4.13 | 3.5 | 3 |
| 4.14 | 3 | 1 |
| 4.15 | 4 | 2 |

The following example illustrates the improvement obtained by formulating the natural product:

Formulae and characteristics of the powders before application

Table 4.3 below summarizes the composition of the mixtures produced in a blender at a temperature of between 190 and 210° C. and with a residence time of the order of 30 seconds.

TABLE 4.3

| Product | Natural PA-11 | Terpolymers 5/ | Terpolymers 1/ | Pigments (TiO$_2$, carbon black, etc.) | Antioxidant and spreading agent |
|---|---|---|---|---|---|
| 4.10 | 1000 | | | | |
| 4.11 | 1000 | 40 | 80 | | |
| 4.12 | 1000 | 40 | 80 | 120 | 9 |

Application and evaluation

The conditions of applications are the same as those in Example 2.2.

The evaluation is carried out using the same method as that described in the preceding example.

Results

These are summarized in Table 4.4 below.

They highlight the crucial importance of the formulation for the properties.

TABLE 4.4

| PRODUCTS Method of application I: immersion ES: electrostatic | 4.10 I | 4.11 I | 4.12 I | 4.12 ES |
|---|---|---|---|---|
| Initial adhesion | 1 | 4 | 4 | 4 |
| Saline mist period for the adhesion to become lower than 1.5 | / | 1000 h Adhesion = 1 | >2000 h | >2000 h |
| Adhesion at 2000 h | 0 | 0.5 | 2 | 4 |

The following example illustrates the improvement obtained by formulating the natural product with the grafted derivative of the terpolymer 5/, Terpolymer 6/:

Formulae and characteristics of the powders before application

Table 4.5 below summarizes the composition of the mixtures produced in a blender at a temperature of between 190 and 210° C. and with a residence time of the order of 30 seconds.

TABLE 4.5

| Product | Natural PA-11 | Terpolymers 5 | Terpolymers 6 | Terpolymers 1 | Pigments (TiO$_2$, carbon black, etc.) | Antioxidant and spreading agent |
|---|---|---|---|---|---|---|
| 4.12 | 1000 | 40 | | 80 | 120 | 9 |
| 4.5 | 1000 | | 40 | 80 | | |
| 4.13 | 1000 | | 40 | 80 | 120 | 9 |

Application and evaluation

The conditions of applications are the same as those in Example 2.2.

The evaluation is performed using the same method as that described in the preceding example.

Results

These are summarized in Table 4.6 below.

They highlight the importance of the formulation and of the grafting of the EVOH on the ageing properties of the coating in the saline mist.

TABLE 4.6

| PRODUCTS Method of application | 4.12 I | 4.5 I | 4.13 I |
|---|---|---|---|
| Initial adhesion | 4 | 4 | 4 |
| Saline mist period for the adhesion to become lower than 1.5 | >2000 h | 1500 h Adhesion = 1 | >2000 h |
| Adhesion at 2000 h | 2 | 1 | 3.5 |

5/ ES auto applicability when the copolymer (A) is added as a dry blend or in bulk, coupled or not coupled with the EVOH Direct application without primer Example 5.1

Auto applicability when the terpolymer 1/ is added as a dry blend

Formulae and characteristics of the powders before application 1.5 kg of PA-11 powder with an inherent viscosity of 0.9, and 7.5 g of terpolymer 1/ powder (i.e. 5 parts by mass), with a particle size smaller than 60 μm, are charged into a fast mixer of Henschel® type.

The PA-11 considered is pigment-free (natural formulation) or else contains 23 mass % of white pigments (white formulation).

Both formulations contain approximately 2 mass % of spreading and antioxidant additives.

The mixture is stirred for 100 s at a speed of 1800 rev/min. The powder obtained is used as it is.

In this case, since the polymer additive powders are mixed with the powder before application, it is no longer possible to speak of a multiphase structure of the powder. On the other hand, the final film has a structure containing nodules of terpolymer 1/ close in size to that of the grains of powder of this same product added as a dry blend.

Application

The powder obtained above is deposited at ambient temperature by electrostatic spraying onto a steel plate which has previously been subjected to degreasing followed by a mechanical or chemical surface treatment (shot-blasting, phosphating, etc., see Table 5.1 below). The metal surface is at zero potential during the application.

The combined plate plus powder is then taken, without waiting, into a ventilated oven maintained at 220° C., where it stays for 5 minutes and is then removed from the oven and cooled freely in air.

Evaluation

The film obtained is examined in order to detect whether debonding of powder has taken place during the stoving. This is revealed by the presence of wide areas of metal which are not coated with polyamide.

A rating from 0 to 4 is performed according to the following criteria:

Class 0: No more coating on the plate, all the coating has fallen off in the oven.

Class 1: At least half of the coating has fallen off during the melting, leaving the metal plate bare.

Class 2: There are a few points of debonding of the coating, generally at the edges and at the corners of the plates.

Class 3: No debonding. Presence of wetting defects: bubbles, craters etc.

Class 4: The coating is stretched and does not exhibit any wetting or spreading defect.

Results

Tables 5.1 to 5.4 collate the results as a function of the base PA-11 powders and of the application conditions:

TABLE 5.1

NATURAL POWDER APPLIED POSITIVELY (+30 kV)

| Support: steel: | Powder without additive | Powder + 5 parts of terpolymer 1/ |
|---|---|---|
| shot-blasted | 1 | 4 |
| smooth | 1 | 4 |
| Iron phosphating | 0 | 2 |
| Zinc phosphating | 3 | 3 |
| Degreased galvanized | 3 | 4 |
| smooth covered with storage oil | 3 | 4 |

TABLE 5.2

NATURAL POWDER APPLIED NEGATIVELY (−60 kV)

| Support: steel: | Powder without additive | Powder + 5 parts of terpolymer 1/ |
|---|---|---|
| shot-blasted | 1 | 4 |
| smooth | 1 | 4 |
| Iron phosphating | 0 | 2 |
| Zinc phosphating | 3 | 3 |
| Degreased galvanized | 3 | 4 |
| smooth covered with storage oil | 3 | 4 |

TABLE 5.3

WHITE POWDER APPLIED POSITIVELY (+30 kV)

| Support: steel: | Powder without additive | Powder + 5 parts of terpolymer 1/ |
|---|---|---|
| shot-blasted | 2 | 4 |
| smooth | 2 | 4 |
| Iron phosphating | 0 | 3 |
| Zinc phosphating | 3 | 3 |
| Degreased galvanized | 3 | 3 |
| smooth covered with storage oil | 3 | 4 |

TABLE 5.4

WHITE POWDER APPLIED NEGATIVELY (−60 kV)

| Support: steel: | Powder without additive | Powder + 5 parts of terpolymer 1/ |
|---|---|---|
| shot-blasted | 2 | 4 |
| smooth | 2 | 4 |
| Iron phosphating | 1 | 3 |
| Zinc phosphating | 2 | 3 |
| Degreased galvanized | 3 | 3 |
| smooth covered with storage oil | 3 | 4 |

Example 5.2

Auto applicability when the terpolymer 1/ is added in bulk

In this example the terpolymer 1/ is mixed in bulk with the polyamide.
Formulae and characteristics of the powders before application Table 5.5 below summarizes the preparations carried out in a blender at a temperature of between 190 and 210° C. and with a residence time of the order of 30 seconds. The product obtained is next ground in order to obtain a powder of conventional particle size for application by an electrostatic route.

One natural, one white and one grey powder are thus exemplified.

The white powder contains 10 parts by weight of white pigments, the grey powder approximately 19 parts by weight of pigments and 9 parts by weight of spreading agent and antioxidant.

The proportions shown are expressed in parts by weight (i.e. 5 parts means 5 g in 1000 g of PA-11).

The structure of the powder obtained is comparable to that described in part 3/.

TABLE 5.5

| Product | Natural PA-11 | White PA-11 | Grey PA-11 | Terpolymer 5/ ethylene-vinyl alcohol-vinyl acetate | Terpolymer 1/ |
|---|---|---|---|---|---|
| 5.1 | 1000 | | | 40 | |
| 5.2 | 1000 | | | 100 | |
| 5.3 | | 1000 | | 40 | |
| 5.4 | | 1000 | | 100 | |
| 5.5 | 1000 | | | | 80 |
| 5.6 | 1000 | | | | 150 |
| 5.7 | | 1000 | | | 80 |
| 5.8 | | 1000 | | | |
| 5.9 | | | 1000 | 40 | 80 |
| 5.10 | | | 1000 | 80 | 40 |

Application and evaluation

These are of the same type as in the preceding example.
The applications by electrostatic spraying are performed on 100×100×1 mm previously shot-blasted and degreased steel plates.

Results

These are summarized in Table 5.6 below:

TABLE 5.6

| Product | ES positive +30 kV | ES negative −60 kV |
|---|---|---|
| 5.1 | Class 1 | Class 1 |
| 5.2 | Class 1 | Class 1 |
| 5.3 | Class 1 | Class 1 |
| 5.4 | Class 1 | Class 1 |
| 5.5 | Class 4 | Class 4 |
| 5.6 | Class 4 | Class 4 |
| 5.7 | Class 4 | Class 4 |
| 5.8 | Class 4 | Class 4 |
| 5.9 | Class 4 | Class 4 |
| 5.10 | Class 4 | Class 4 |

6/ Water-heater behaviour, test 2733:
Application over primer
Formulae and characteristics of the powders before application Table 6.1 below summarizes the composition of the preparations produced in a blender at a temperature of between 190 and 210° C. and with a residence time of the order of 30 seconds. The product obtained is next ground in order to obtain a powder of conventional particle size for application by immersion.

The proportions shown are expressed in parts by weight (i.e. 5 parts means 5 g in 1000 g of PA-11). The PA-11 considered has a number-average molecular mass, measured by GPC: Mn =20 000 g/mol.

TABLE 6.1

| Product | 6.1 | 6.2 |
|---|---|---|
| Polyamide-11 | 1000 | 1000 |
| Inorganic fillers | 155 | 155 |
| Terpolymer 1/ | 80 | 0 |
| Good-rite 3114 antioxidant | 10 | 10 |

Application

The metal substrate, 100×100×3 mm in size, is shot-blasted, degreased and precoated with a phenolic epoxy primer marketed by Elf Atochem under the name "Rilprim® P23V40". This primer is approximately 20 μm in thickness. The powder is next applied by immersion after preheating the article for 10 minutes at 300° C. The immersion lasts from 4 to 8 seconds in all and the article leaving the fluidized bed is stoved for 5 minutes at 220° C. and then subsequently cooled freely in air.

The coating thicknesses obtained are of the order of 400±50 μm.

Evaluation

The plates thus coated are tested according to ISO Standard 2733.

The top plate is examined after 500 and 1000 hours of test and the results are summarized in Table 6.2.

TABLE 6.2

| Formulation tested | 1 | 2 |
|---|---|---|
| 500 hours of test | | |
| Number of blisters | NONE | Approximately 60 (blistering 3M to 2F according to ASTM Standard D714-56) |
| Blister size | / | 2 to 6 mm |
| 1000 hours of test | | |
| Number of blisters | NONE | / |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Composition consisting of (i) at least one polyamide and having a melting temperature from greater than 130° C. to 270° C. and at least one copolymer (A) of ethylene with at least one comonomer selected from the group consisting of unsaturated carboxylic acids, esters of unsaturated carboxylic acids and vinyl esters of saturated carboxylic acids, optionally including EVOHs, PVALs and/or modified PVALs. and (ii) being in powder form.

2. Composition according to claim 1, wherein the copolymer (A) is a copolymer of ethylene and of (meth)acrylic acid, or a copolymer of ethylene and of vinyl acetate, at least one copolymer optionally including grafted or copolymerized unsaturated carboxylic acid anhydride units.

3. Composition according to claim 1, wherein the copolymer (A) is a copolymer (i) of ethylene, (ii) of (meth)acrylic acid and/or of an ester of (meth)acrylic acid and (iii) of an unsaturated carboxylic acid anhydride, the said copolymer (A) being grafted with a monoamine product.

4. Composition according to claim 1, wherein the copolymer (A) is a copolymer including ethylene units, unsaturated carboxylic acid and/or unsaturated carboxylic acid ester units and unsaturated epoxide units.

5. Composition consisting of at least one polyamide having a melting temperature from greater than 130° C. to 270° C. and at least one EVOH and/or a modified PVAL but not including the copolymer (A) and (ii) being in powder form.

6. Composition according to claim 1, wherein it is in the form of a polyamide matrix in which are dispersed nodules (i) of copolymer (A) or (ii) of copolymer (A) and of EVOH and/or of modified or unmodified PVAL or (iii) of EVOH and/or of modified PVAL.

7. Composition consisting of at least one polyamide powder having a melting temperature from greater than 130° C. to 270° C. and at least one powder of a copolymer (A) of ethylene with at least one comonomer selected from the group consisting of unsaturated carboxylic acids, esters of unsaturated carboxylic acids and vinyl esters of saturated carboxylic acids, optionally including EVOHs, PVALs and/or modified PVALs.

8. Composition according to claim 7, wherein the copolymer (A) is that of claim 2.

9. Composition consisting of at least one polyamide powder having a melting temperature from greater than 130° C. to 270° C. and at least one powder of an EVOH and/or of modified PVAL but not including copolymer (A) powder.

10. Composition (i) according to claim 1 consisting of at least one polyamide, optionally including EVOHs, PVALs and/or modified PVALs, and either a copolymer (A) of ethylene and of at least one comonomer selected from the group consisting of unsaturated carboxylic acids, esters of unsaturated carboxylic acids and vinyl esters of saturated carboxylic acids;

or the copolymer (A) and an EVOH and/or a modified or unmodified PVAL;

or an EVOH and/or a modified PVAL and not including the copolymer (A)

(ii) being in powder form, (iii) the constituents of (I) being distributed between grains of powder made up of a single constituent and grains of powder which are made up of several constituents.

11. Composition according to claim 1, comprising fillers, pigments, or antioxidants.

12. Composite material comprising a metal substrate and a coating formed from powders according to claim 1.

13. Composite material according to claim 12, wherein the layer of powders has been melted to make a coating.

* * * * *